(12) United States Patent
Jain et al.

(10) Patent No.: US 9,285,535 B2
(45) Date of Patent: Mar. 15, 2016

(54) HIGH-Q OPTICAL RESONATORS AND METHOD OF MAKING THE SAME

(71) Applicant: STC.UNM, Albuquerque, NM (US)

(72) Inventors: Ravinder K. Jain, Albuquerque, NM (US); Mani Hossein-Zadeh, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 140 days.

(21) Appl. No.: 13/960,659

(22) Filed: Aug. 6, 2013

(65) Prior Publication Data

US 2014/0290311 A1    Oct. 2, 2014

Related U.S. Application Data

(60) Provisional application No. 61/680,229, filed on Aug. 6, 2012.

(51) Int. Cl.
| | | |
|---|---|---|
| *C03B 37/15* | (2006.01) | |
| *G02B 6/02* | (2006.01) | |
| *G02B 6/26* | (2006.01) | |
| *H01S 3/06* | (2006.01) | |
| *G02B 6/12* | (2006.01) | |
| *H01S 3/16* | (2006.01) | |
| *H01S 3/17* | (2006.01) | |

(52) U.S. Cl.
CPC ............ *G02B 6/02052* (2013.01); *G02B 6/262* (2013.01); *G02B 2006/12038* (2013.01); *G02B 2006/12109* (2013.01); *G02B 2006/12159* (2013.01); *G02B 2006/12169* (2013.01); *H01S 3/0627* (2013.01); *H01S 3/1608* (2013.01); *H01S 3/173* (2013.01)

(58) Field of Classification Search
None
See application file for complete search history.

(56) References Cited

U.S. PATENT DOCUMENTS

| | | | |
|---|---|---|---|
| 2003/0000256 A1* | 1/2003 | Ukrainczyk et al. | ............ 65/404 |
| 2011/0052121 A1* | 3/2011 | Zheng | .................. G02B 6/2552 385/35 |

OTHER PUBLICATIONS

Wang et al., "High-Q Bismuth-Silicate Nonlinear Glass Microsphere Resonators", IEEE Photonics Journal, Jun. 2012, pp. 1013-1020.*
Wang et al., "Review of Fabrication Techniques for Fused Fiber Components for Fiber Lasers", SPIE Photonic West'09, Fiber Lasers VI: Technology, Systems, and Applications, 2009, 11 pages.*
Wu et al., "Observation of whispering gallery modes in the mid-Infrared with a Quantum Cascade Laser: possible applications to nanoliter chemical sensing", Proc. of SPIE vol. 7222, Mar. 7, 2011, 10 pages.*

* cited by examiner

*Primary Examiner* — Lisa Herring
(74) *Attorney, Agent, or Firm* — Keith A. Vogt; Vogt IP

(57) ABSTRACT

An optical resonator made from an elongated fiber having a proximal and distal end. A sphere is created on the distal end by locating the distal end in cylindrically symmetrical heating zone along a centerline. For some embodiments, the distal end is rapidly cooled by allowing it to retract away from the heating zone along the centerline during the formation and solidification of the molten microsphere. The resulting optical resonator has an intrinsic quality factor greater than $10^6$ over the 2.0 to 3.2 μm MIR wavelength range.

20 Claims, 10 Drawing Sheets

HIGH-Q OPTICAL RESONATORS AND METHOD OF MAKING THE SAME

CROSS-REFERENCE TO RELATED APPLICATIONS

This application claims the benefit U.S. Provisional Application No. 61/680,229, filed Aug. 6, 2012 and herein incorporated by reference.

STATEMENT REGARDING FEDERALLY SPONSORED RESEARCH OR DEVELOPMENT

This work was supported by AFOSR grant FA9550-12-1-0049 and NSF grant ECCS-1232263.

INCORPORATION-BY-REFERENCE OF MATERIAL SUBMITTED ON A COMPACT DISC

Not Applicable.

BACKGROUND OF THE INVENTION

1. Field of the Invention

High optical quality (high-Q) optical resonators, including whispering gallery mode (WGM) microresonators, have been the subject of investigation because of their strong potential for use in high-performance photonic devices. The Q-value, Q or Q-factor (quality factor) of a resonator is a measure of its energy storage capacity and the internal buildup of optical fields, and is reflected by the linewidths of the optical resonances in the microresonator. Potential applications for these devices include ultra-sensitive molecular detectors as well as advanced light sources, such as narrow-linewidth lasers and comb generators. The unique characteristics of these devices are particularly relevant for mid-infrared (MIR) applications, because of the stronger molecular absorption lines in the MIR, and because of the increasing need for frequency comb sources in this "molecular fingerprint" region.

Glasses represent an excellent class of materials for the fabrication of high-Q optical resonators, because of the relative ease of fabricating high-purity glasses with ultralow absorption losses and their amenability for high-concentration doping of rare-earths, as needed for luminescent sources and lasers. Glasses may easily be formed into optical resonators by fabrication processes such as melting and cooling into microspheres. Success has been achieved in the fabrication of optical resonators based on silica glasses, including demonstration of microspheres with Q's as high as $10^{10}$ at near-IR wavelengths. However, due to the rapid increase in multi-phonon absorption at wavelengths>2 microns, silica glasses are not usable for fabrication of high-Q MIR optical resonators and are limited to applications in the near-IR spectral range.

Potential low-phonon energy glasses developed for MIR applications include fluorides, chalcogenides, and tellurides. The basic physics of microsphere formation in glasses is similar to the formation of macrospheres such as marbles or ball bearings. It involves a relatively well-understood interplay between the surface tension and viscosity of the material. However, the need for sufficiently high Q's ($>10^7$) in optimal microspherical optical resonators imposes severe demands on the formation process, notably on the shape and smoothness of the surface, and on the minimization of subsurface structural imperfections, caused in part by the inevitable formation of microcrystallites in glasses. Thus, fabrication of high-Q optical resonators from MIR glasses such as $ZrF_4$—$BaF_2$—$LaF_3$—$AlF_3$—NaF (ZBLAN) and indium fluoride ($InF_3$) as well as tellurides and chalcogenides presents challenges not found in processes concerning silica glasses. Fabrication of optical resonators from these materials requires a better understanding of the microsphere formation process, and more precise control of the melting and cooling processes, and of the ambient environment.

Previous efforts to fabricate optical resonators from MIR glasses based on conventional methods including microwave plasma heating and $CO_2$ laser heating used for the fabrication of silica microspheres have resulted in microspheres of poor surface quality (and therefore low Q's) due to significant differences between the physical and thermo-optical characteristics of MIR glasses and silica. More specifically, the small temperature difference between the melting and crystallization temperatures ($T_m$ and $T_x$) and—more importantly—between the glass softening and crystallization transition temperatures ($T_g$ and $T_x$) facilitates the creation of highly scattering microcrystallites that degrade the Q-factor of the microsphere due to bulk and surface scattering. The value of ($T_g$-$T_x$) and the consequent glass stability is dependent on the heating rate and precise control of the local temperature and cylindrical symmetry of the heating source, with slower heating rates leading to larger values of ($T_g$-$T_x$), and thus to reduced crystallization.

The largest reported Q-value of a ZBLAN microsphere is about $10^6$. This was achieved via the use of free fall techniques with or without zero gravity environments and with or without the use of liquid "catch basins" for the falling microspheres. In these experiments, free falling Er:ZBLAN microparticles of a large range of uncontrolled sizes, formed from ground powders, were melted by large heaters—such as a microwave plasma torch—during the free fall, and surface tension resulted in the formation of microspheres. Microspheres have also been fabricated in chalcogenide glasses using similar techniques, and asymmetric (non-cylindrically symmetric) electric heaters. In general, the above described methods are complicated and impractical, and result in low yields and poor size control.

BRIEF SUMMARY OF THE INVENTION

The present invention provides a solution to the above problems. It provides a novel method for fabricating optical resonators that is not only simple and amenable to a higher level of reproducibility and manufacturability, but also facilitates a generally cylindrically-symmetrical heating and cooling, resulting in optical resonators with Q's of $10^7$ or greater. This Q-value creates optical resonators that are useful in state-of-the-art devices. Furthermore, the method of the present invention allows for the fabrication of high quality optical resonators including whispering-gallery mode (WGM) optical microresonators in soft and low melting point glasses, including ZBLAN and indium fluoride glasses, and glasses that have the potential for very low losses in the mid-infrared (MIR) wavelength range. Moreover, the present invention allows for the fabrication of optical resonators having Q's of over $3 \times 10^8$ over the 2.0 to 3.2 microns MIR wavelength range in ZBLAN microcavities. Moreover, the methods of the invention may be used to produce uniformly sized microspheres having controlled Q's in the range of $10^2$ to $10^8$ in a large variety of glasses to enable new commercializable microresonator fabrication for applications at wavelengths ranging from the MIR to the near ultraviolet.

DETAILED DESCRIPTION OF THE INVENTION

The following description of the preferred embodiments focuses on fabricating near-spherical optical resonators using low-phonon energy glasses such as ZBLAN, $AlF_3$, and $InF_3$. glasses ZBLAN glasses have a mid-infrared (MIR) transparency window that extends to 4 microns, and have already been demonstrated as highly effective hosts for lasers and luminescent sources in the 3 micron spectral region. $InF_3$ and $AlF_3$ glasses exhibit several beneficial properties, including extended transparency ranges (of up to 5.5 microns and beyond) and potentially lower intrinsic losses at specific wavelengths in the mid-infrared.

However, the present invention also applies to fabricating optical resonators from other glasses, including the low-phonon energy glasses that have been historically difficult to work with because of their lower glass stability $(T_g-T_x)$ ranges. This includes, but is not limited to, fluorides, chalcogenides, and tellurides. In addition, other glasses may be used such as soft glasses or glasses having low melting and glass transition temperatures and very low $(T_g-T_x)$ values.

Figure 1:
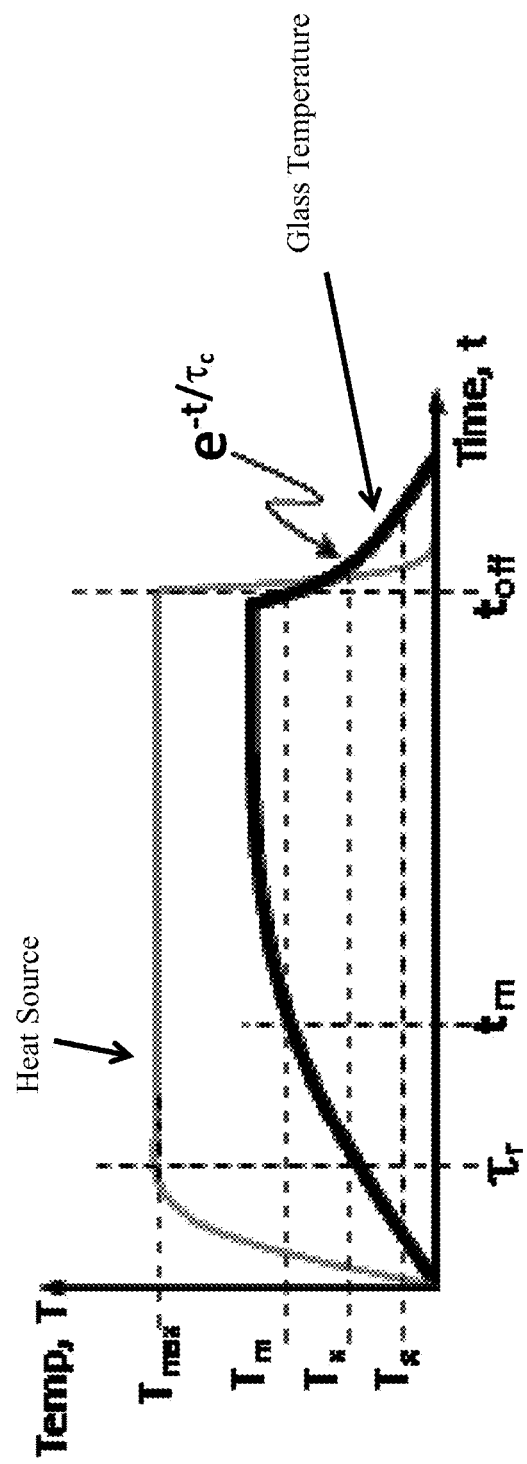
FIG. 1 schematically depicts qualitative temperature vs. time profiles of the heat input and the glass during formation of a microsphere.

FIG. 1 schematically depicts qualitative temperature-vs-time profiles depicting heating of glasses for microsphere formation. The curve identified as Heat Source corresponds to the thermal driving function or the heat source and the curve entitled Glass Temperature is the temperature of the glass. The horizontal axis represents time in arbitrary units, starting with the "turn-on" of the heat source at t=0, although time scales varying from a few milliseconds to a few seconds are the most common.

At a time $t>t_m$, given appropriate conditions of viscosity, surface tension, and rate of heat influx, the mass of the molten material acquires a spherical shape, with a continuous evolution of this shape due to changes in the viscosity and tension, depending in part on the symmetry of the heat input from the driving thermal source. An important phase in the formation of the microsphere occurs at the onset of cooling, when the thermal energy source or the thermal transfer of heat to the molten microsphere is reduced or stopped. The Q of the resulting optical resonators is affected by the cooling process. During the cooling period $(t>t_{off})$, even if the molten glass starts off with a perfect spherical shape, imperfections in the surface quality and subsurface blemishes may creep into the "freezing" or solidification process because of the lack of appropriate symmetry in the cooling process, the rate of glass cooling (decay rate, $\tau_c$, and the local environment. Lack of general symmetry—especially cylindrical symmetry—in the heating source or cooling conditions can cause distortion of the surfaces, while slow cooling times and uncontrolled non-inert or reactive chemical environments can cause an increase in crystallization, incorporation of impurities and subsurface damage.

It is thus important for the formation of high-Q microspheres to not only use a heating source that is nearly cylindrically symmetric, but also to control the local environment around the microsphere, and to use a process that enables nearly cylindrically symmetric and rapid cooling (to minimize oxidative and chemically-reactive impurity losses, and distortions and crystallization during the cooling and solidification processes). This is even more important for low-phonon energy glasses such as ZBLAN, $AlF_3$, and $InF_3$. For example, ZBLAN has a high propensity for crystallization, especially if it is cooled slowly, since its crystallization point $(T_x \sim 400°$ C.) is relatively close to its melting point $(T_m \sim 450°$ C.). The values of $T_g$, $T_x$, and $T_m$ are dependent on several aspects of the material, including the exact compositions and heating and cooling rates.

Figures 2, 3, 4:
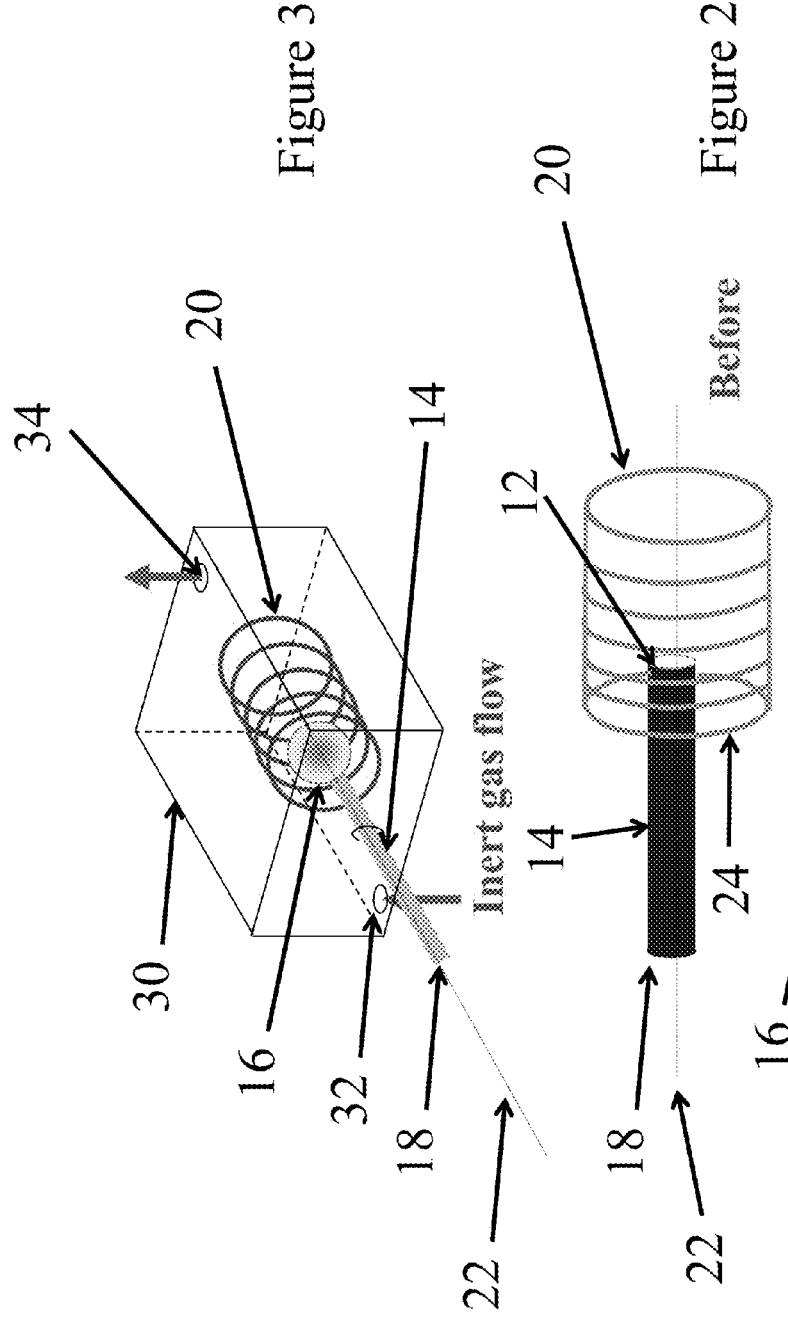
FIG. 2 illustrates an embodiment of the present invention at an early stage in the formation of a microsphere.
FIG. 3 illustrates an arrangement of an embodiment of the present invention during the formation of a microsphere.
FIG. 4 illustrates an arrangement of an embodiment of the present invention at a later stage in the formation of a microsphere.

FIGS. 2 through 4 illustrate an embodiment of the present invention for fabricating an optical resonator 10. As shown in FIG. 2, tip 12 of ZBLAN fiber 14, which is preferably a low-loss commercial ZBLAN fiber of 100 to 150 microns in diameter, is inserted into cylindrically symmetric heating element 20. The use of a cylindrically symmetrical heating element 20 provides symmetrical heating that results in the formation of high-Q microspheres. In a preferred embodiment, a small cylindrical electrical micro-heater of about 800 microns in diameter and about 600 microns in length was used to create a highly uniform and cylindrically-symmetric heat zone near tip 12 of the cleaved ZBLAN fiber 14. The heating element could be an electrical tungsten micro-heater.

Positioning fiber 14 along a centerline 22 of the heating element 20 promotes the nearly uniform and nearly cylindrically symmetric heating of fiber 14 and microsphere 16. This further promotes obtaining a high-Q value for the resulting optical resonator 10. It has also been found that perfectly uniform and perfectly cylindrically symmetric heating and cooling is not required. Small amounts of nonuniformity and cylindrical asymmetry will still achieve the objects of the present invention. Thus, a general or nearly cylindrically symmetric heating and cooling is still within the scope of the invention.

Figure 5:
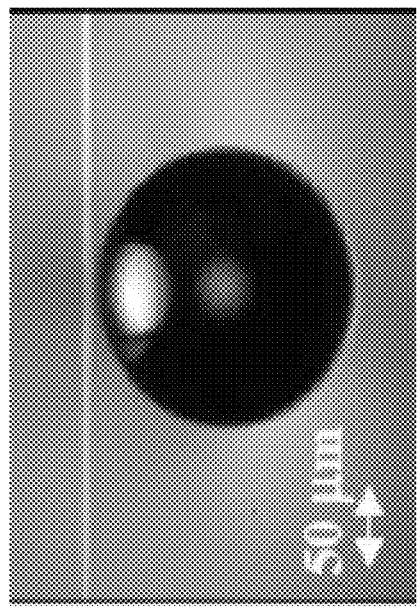
FIG. 5 is a top view of a ZBLAN microsphere coupled to a silica fiber-taper.
Figure 6A:
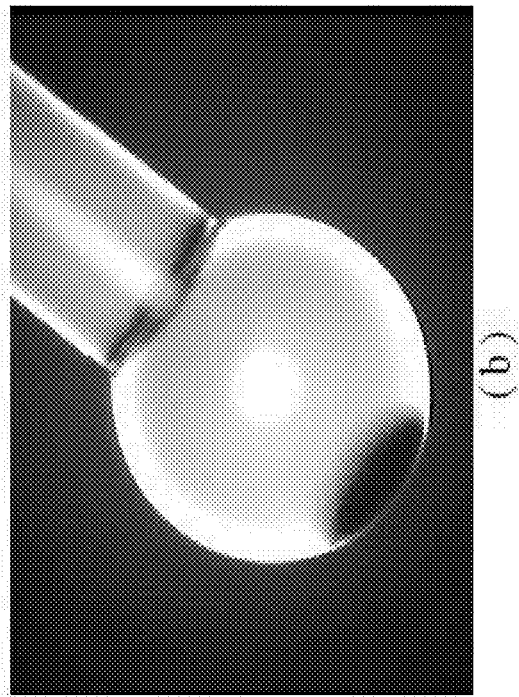
FIG. 6A is a micrograph of an optimized ZBLAN microsphere formed at the tip of a ZBLAN fiber using back illumination.
Figure 6B:
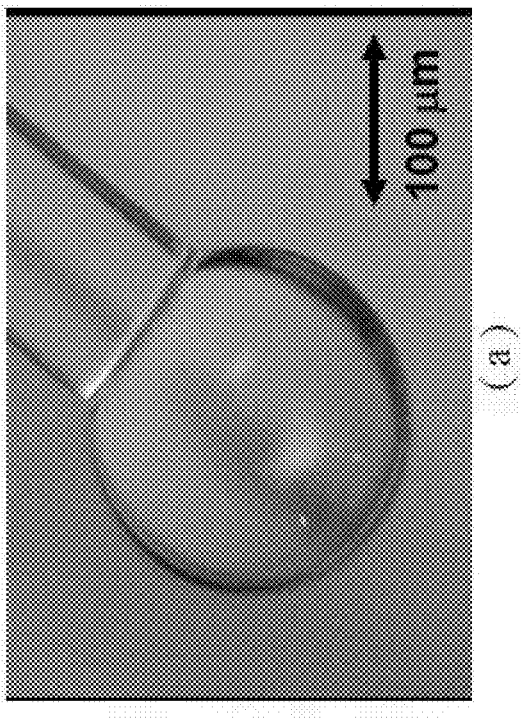
FIG. 6B is a micrograph of an optimized ZBLAN microsphere formed at the tip of a ZBLAN fiber using front illumination.

Varying the magnitude and duration of the heating pulse controls the formation process and the size of the microsphere 16. In a preferred embodiment, the duration of the heat current pulse may typically be 4 to 10 seconds. This not only maintains control over the formation process, but it also controls the diameter of the resulting microsphere which may obtain a value of 1.5 times the diameter of the original fiber as shown in FIGS. 5 and 6. Thus, microspheres of a desired diameter may be made uniformly and reproducibly.

Figure 7:
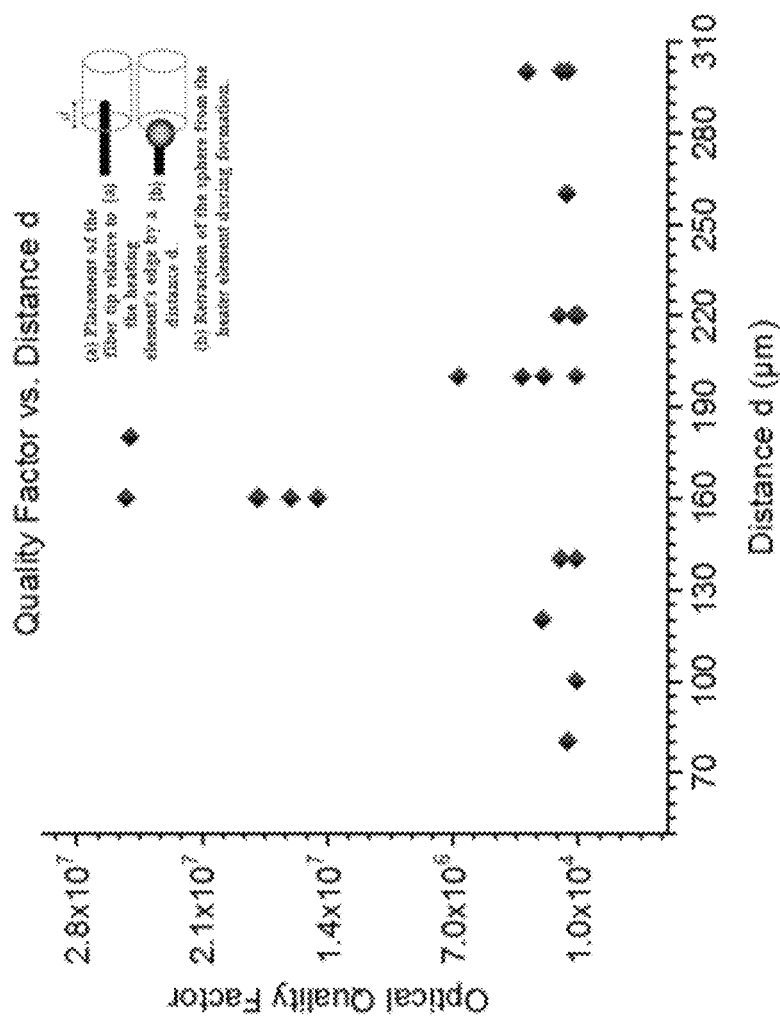
FIG. 7 is a graph of the Q-values measured for one specific fiber and heater geometry and heating conditions as a function of the distance of a fiber tip is inserted into a heating element.
Figure 8:
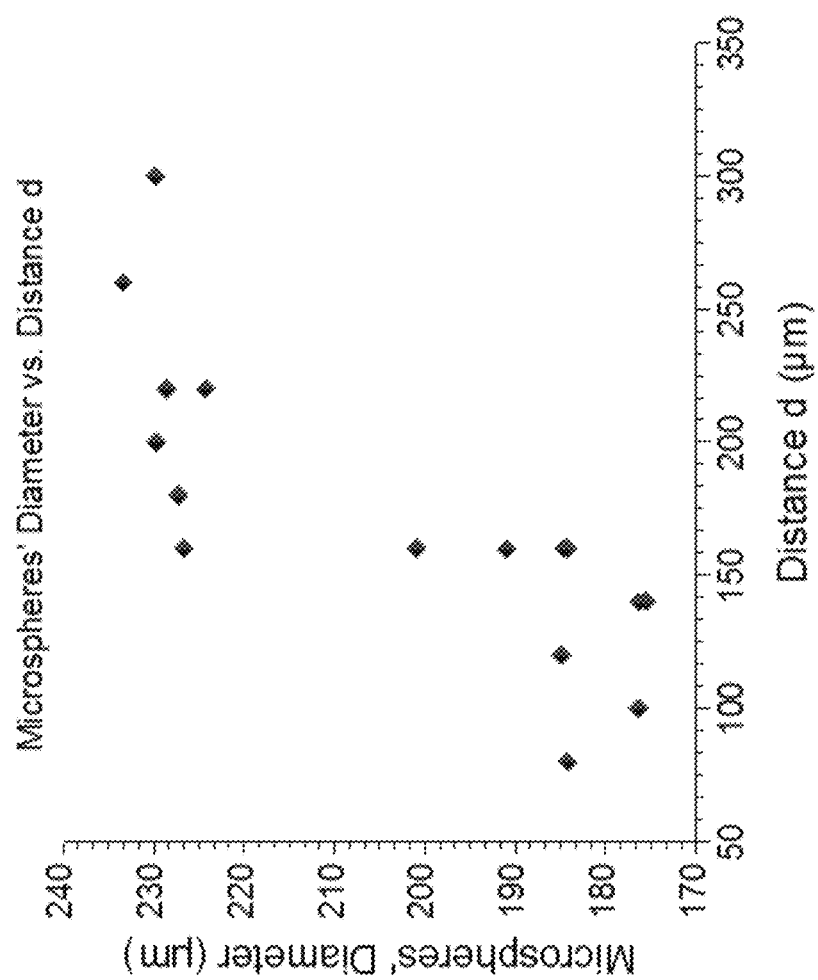
FIG. 8 is a graph of the diameter of the microsphere as a function of the distance a fiber tip is inserted into a heating element.

An exemplary method of fabricating a high-Q value optical resonator 14 includes securing distal end 18 of fiber 14 in a location away from the entrance 24 of the heating element 20. Tip 12 is inserted into heating element 20 along centerline 22, which promotes nearly-uniform and nearly cylindrically-symmetric heating of fiber 14 in the region in the vicinity of fiber tip 12, resulting eventually in melting of the glass fiber tip, and the formation of a molten glass microsphere which subsequently cools and solidifies into the desired high-Q solid glass microresonator. As shown by the experimental results—for the case of ZBLAN fibers of approximately 125 micron diameters—depicted in FIGS. 7 and 8, both the Q-values (see FIG. 7) and sizes/diameters (see FIG. 8) of the resulting microspheres 16 are strongly dependent on the distance that the fiber tips 12 are inserted into the heating region. Depending on the choice of fiber material, heater geometry and heating parameters used, preferred insertion distances are typically in the range of 10 to 350 microns. As seen in FIG. 7, for the experiments conducted with the 125 micron diameter ZBLAN fibers, an insertion distance in the range of 160 to 190 microns was determined to be the most preferred distance, since it resulted in optical resonators having Q's greater than $10^7$ and values over $2.8 \times 10^7$ (and microsphere diameters of about 200 microns). More generally, an insertion distance in the range of 10 to 350 microns may be used.

Clamping distal end 18 a distance from entrance 24 takes advantage of the physical changes that occur in fiber 14 during the melting and cooling processes. As the fiber is heated the shape of cylindrical tip 12 transforms into microphere 16. Upon cooling, the fiber shortens resulting in a rapid retraction from heating element 20 as shown in FIGS. 2 and 4. The rapid retraction accelerates the rate of cooling of fiber 14 and the microsphere 16. Rapid cooling is highly desirable to minimize crystallization, as discussed above.

Heating element 20 may be housed in a chamber 30 having a least one inlet 32 and at least one outlet 34 that allows a gas to be introduced into chamber 30 so that the heating element 20 and fiber 14 are flushed with the gas as shown in FIG. 4. The composition of the gas should be such that it prevents the burning of heating element 20 and oxidation of fiber 14. Bathing the ZBLAN glass in an inert gas such as dry nitrogen, argon, and helium is particularly useful since it prevents the formation of $ZrO_2$ molecules that act as nucleation sites for the growth of ZBLAN crystallites, impurities that negatively affect the Q-value.

In another specific embodiment, a cylindrical electrical heating element was used to created a large and relatively uniform heating zone which allowed for the nearly uniform and nearly cylindrically—symmetric heating of a fiber in a very precise and highly—controlled manner, enabling precise control over the rate of heating of the fibers or fiber tips used. The heating element used was approximately 1 millimeter in diameter and 4 millimeters in length.

It has been found that the $T_g-T_x$ separation for ZBLAN is inversely proportional to the heating rate. Thus, crystallization is minimized by the very slow heating of the ZBLAN fiber on a time scale of several seconds. Moroever, the use of cylindrical uniformity or symmetry minimizes heating gradients from one side of the microparticle to the other, leading to a reliable method of creating spheres free of bulk and surface defects.

Figure 10:
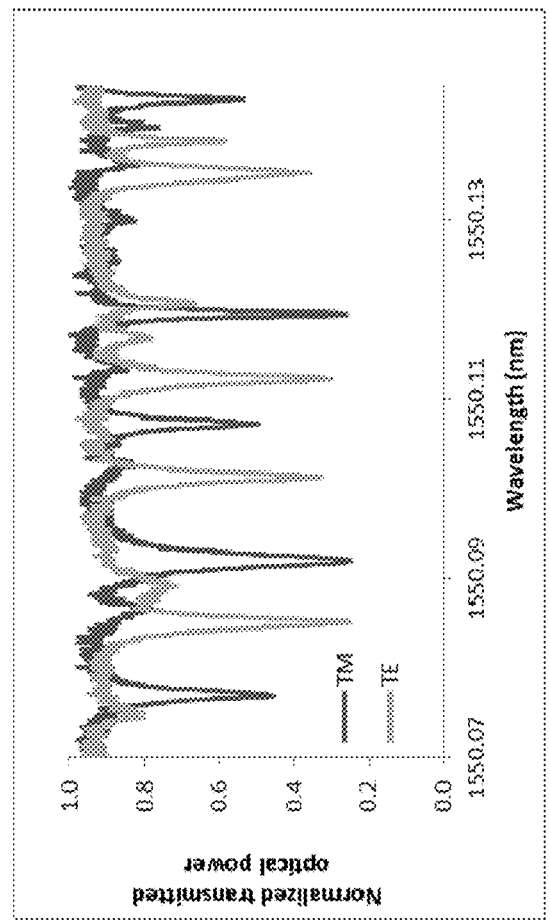
FIG. 10 shows a spectrum of TE and TM WGMs for a ZBLAN microsphere made in accordance with the invention.
Figure 9:
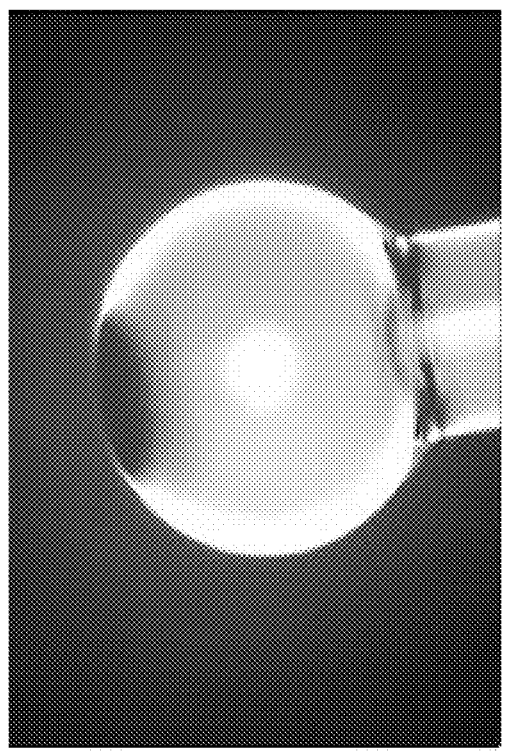
FIG. 9 is a micrograph of an optimized ZBLAN microsphere formed in accordance with an embodiment of the present invention.

To measure the Q-value of the optical resonators made from ZBLAN, a fiber-taper coupling method was used which is well-known in the art. Due to the lack of a suitable narrow linewidth tunable MIR source, the coupling and linewidth measurements were made with a tunable laser at 1.5 microns, which also enabled the use of silica as the material for the fiber taper as shown in FIG. 5. FIG. 10 shows the measured transmission spectrum, depicting several TE and TM modes in the ZBLAN optical resonator shown in FIG. 9. The modal structure and the polarization dependence of the modes are in agreement with a near spherical WGM microcavity.

Figures 11, 12:
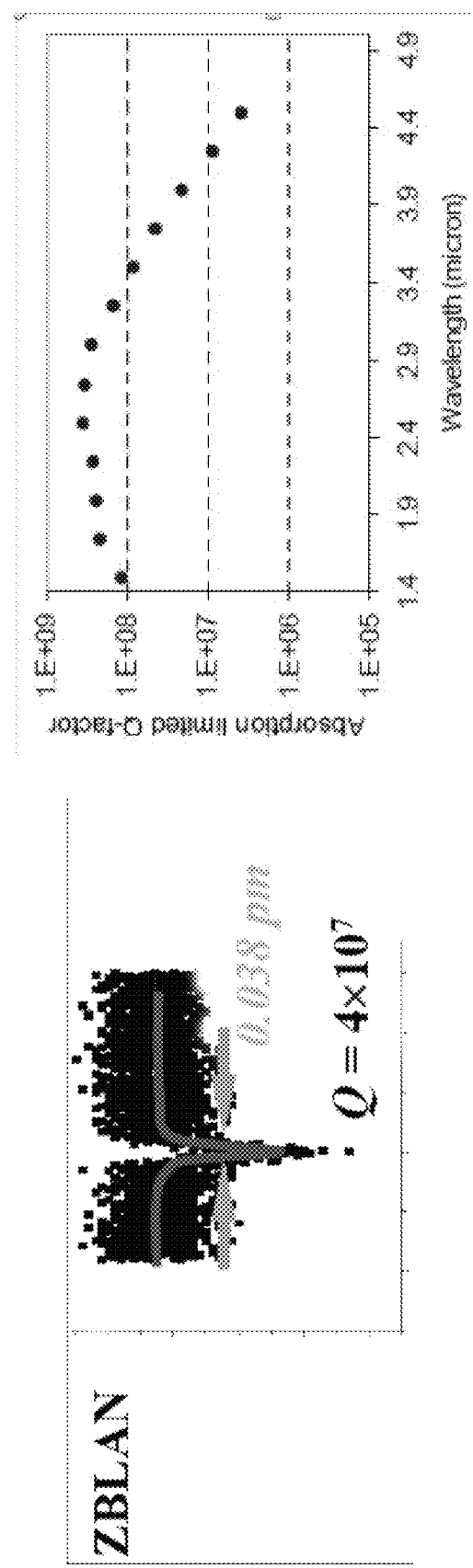
FIG. 11 shows the transmission spectrum of ZBLAN microsphere around a high-Q WGM in the under-coupled regime.
FIG. 12 shows the calculated absorption-limited Q-factor as a function of wavelength for a ZBLAN microsphere made in accordance with the invention.

FIG. 11 shows a high spectral resolution transmission plot for a WGM mode measured in an undercoupled regime using for a ZBLAN optical microresonator manufactured in accordance with the teachings of the invention; a spectral width of 0.038 picometers and unloaded quality factor of $4 \times 10^7$ can be deduced for this microresonator. Despite the extremely high Q-value demonstrated in this teaching example, this measured value of Q is still an order of magnitude lower than that expected from the absorption-limited value at 1.55 microns, presumably due to residual bulk and surface scattering losses. It should be possible to get much higher Q values from microresonators made with this process and similar starting glass fibers by better control and optimization of the described process, say by using increased cylindrical symmetry, a more inert environment, and better methods of cooling the microsphere during the solidification process.

FIG. 12 shows the estimated wavelength dependence of the absorption-limited Q of ZBLAN microspheres based on values for fibers having 0.23, 0.05, and 2.4 dB/m at 1.5, 3 and 4 microns, implying that Q's of over $3 \times 10^8$ near 3 microns are possible at MIR wavelengths in similar ZBLAN optical resonators, provided that the scattering losses due to microcrystallites and surface roughness can be reduced appropriately.

Figures 13, 14:
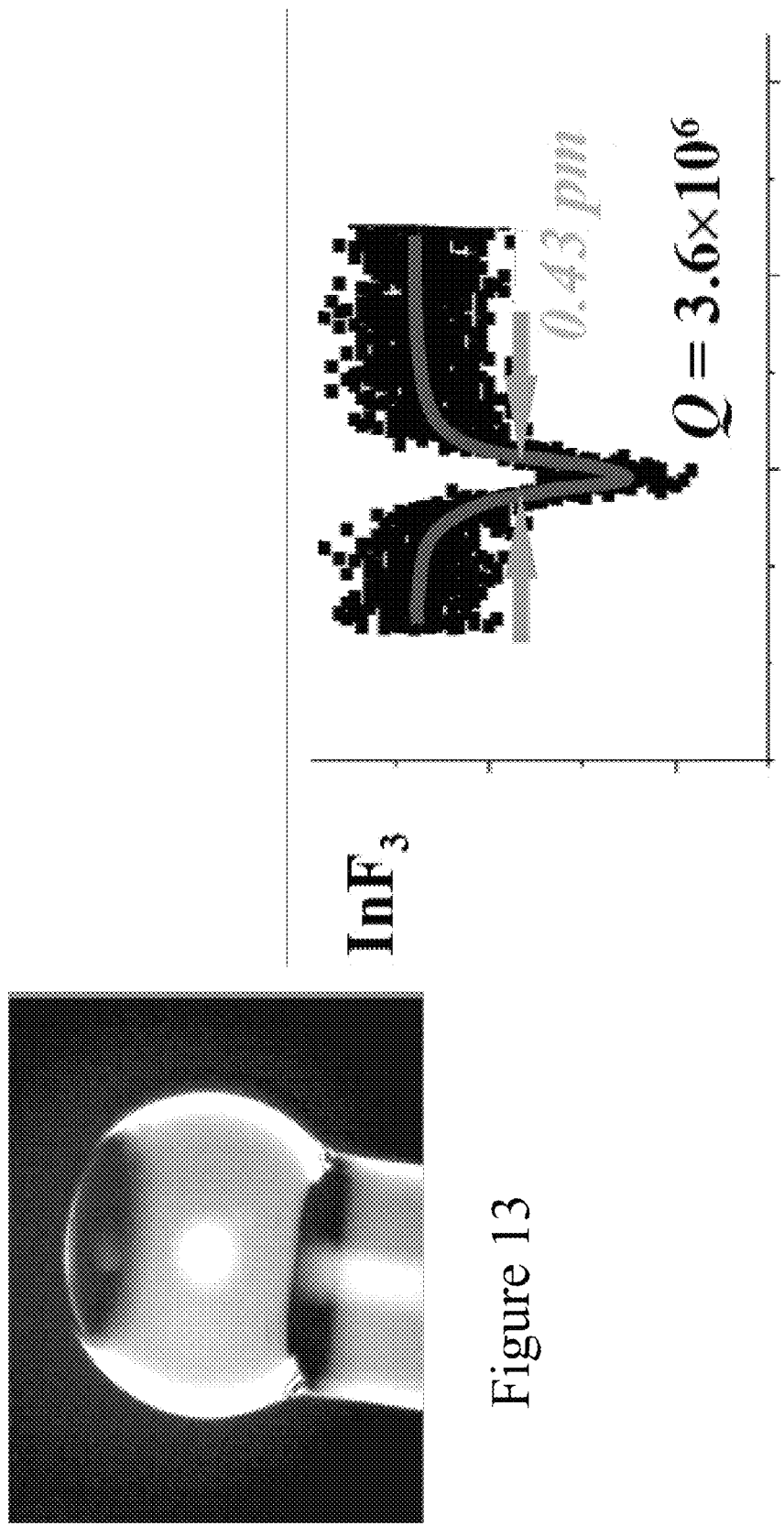
FIG. 13 is a micrograph of an optimized $InF_3$ microsphere formed in accordance with an embodiment of the present invention.
FIG. 14 shows the transmission spectrum of the fiber-taper coupled to the $InF_3$ microsphere in the vicinity of a high-Q WGM resonance near 1550 nanometers in the under-coupled regime.

In another embodiment of the present invention, $InF_3$ optical resonators may be fabricated using the techniques described above. Optical fibers made from $InF_3$ have demonstrated promising properties for use as optical resonators as a result of their large transparency windows in the range of 0.3-5.3 microns combined with low dn/dT, low dispersion and low phonon energy. FIG. 13 shows a photograph of an optical microresonator formed at the tip of an $InF_3$ fiber having a diameter of 100 to 120 microns.

FIG. 14 shows the spectral transmission spectrum of the fiber-taper coupled microsphere in the vicinity of a high-Q WGM in an undercoupled regime. The linewidth of the mode is 0.43 picometers corresponding to an intrinsic quality factor of $3.6 \times 10^6$.

Figure 15:
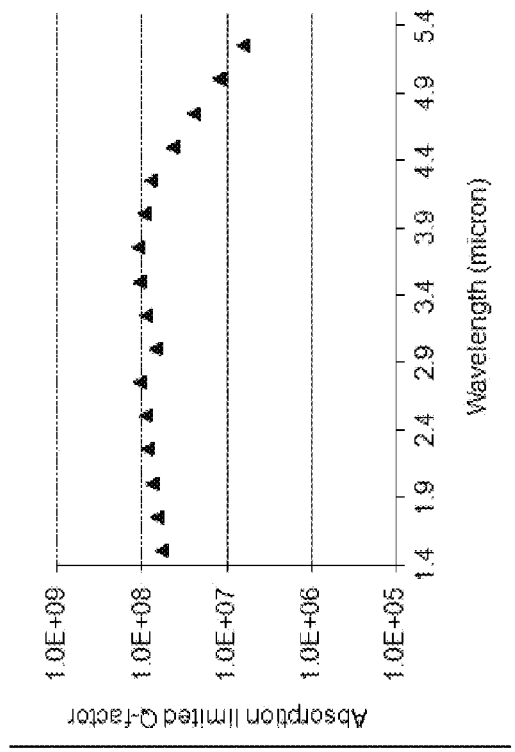
FIG. 15 shows the calculated absorption-limited Q-factor as a function of wavelength for the $InF_3$ microsphere made in accordance with the invention.

FIG. 15 shows the estimated wavelength dependence of the calculated absorption-limited quality factor of ideal $InF_3$ microspheres based on published values of attenuation coefficients in $InF_3$ fibers similar to those used for fabricating the microspheres made in accordance with the present invention.

Figure 16:
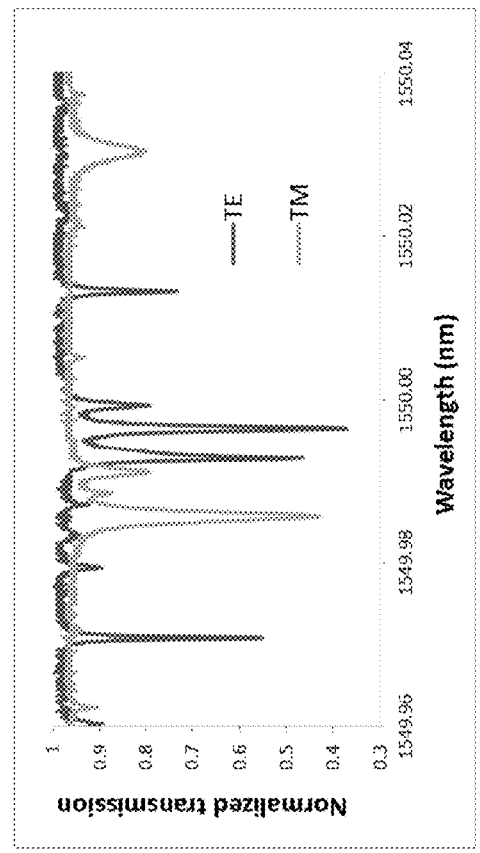
FIG. 16 shows the transmission spectrum over a broader spectral range depicting several TE and TM modes for the $InF_3$ microsphere.

FIG. 16 shows the transmission spectrum over a broader spectral range, depicting several TE and TM modes for the $InF_3$ microsphere. The modal structure and the polarization dependence of the modes are in agreement with a near spherical WGM microcavity.

FIG. 15 also shows that $InF_3$ optical resonators made in accordance with the present invention have projected intrinsic quality factors of about $0.5 \times 10^8$ from 2.4 to about 4 microns and larger than $10^7$ over a mid-IR range as far as 4.9 microns. Such high-Q microresonators have applications in MIR spectroscopy, MIR comb generation, and for the demonstration of low-threshold and narrow-linewidth MIR lasers and related MIR luminescent sensors. In addition, using heavily-doped Er: ZBLAN and Er: $InF_3$ glasses and the efficient cross-relaxation processes between Er ions in such heavily-doped Er glasses, tunable low-threshold lasers and luminescent spectroscopic sensors in the 3 micron spectral region can be created.

Figure 17:
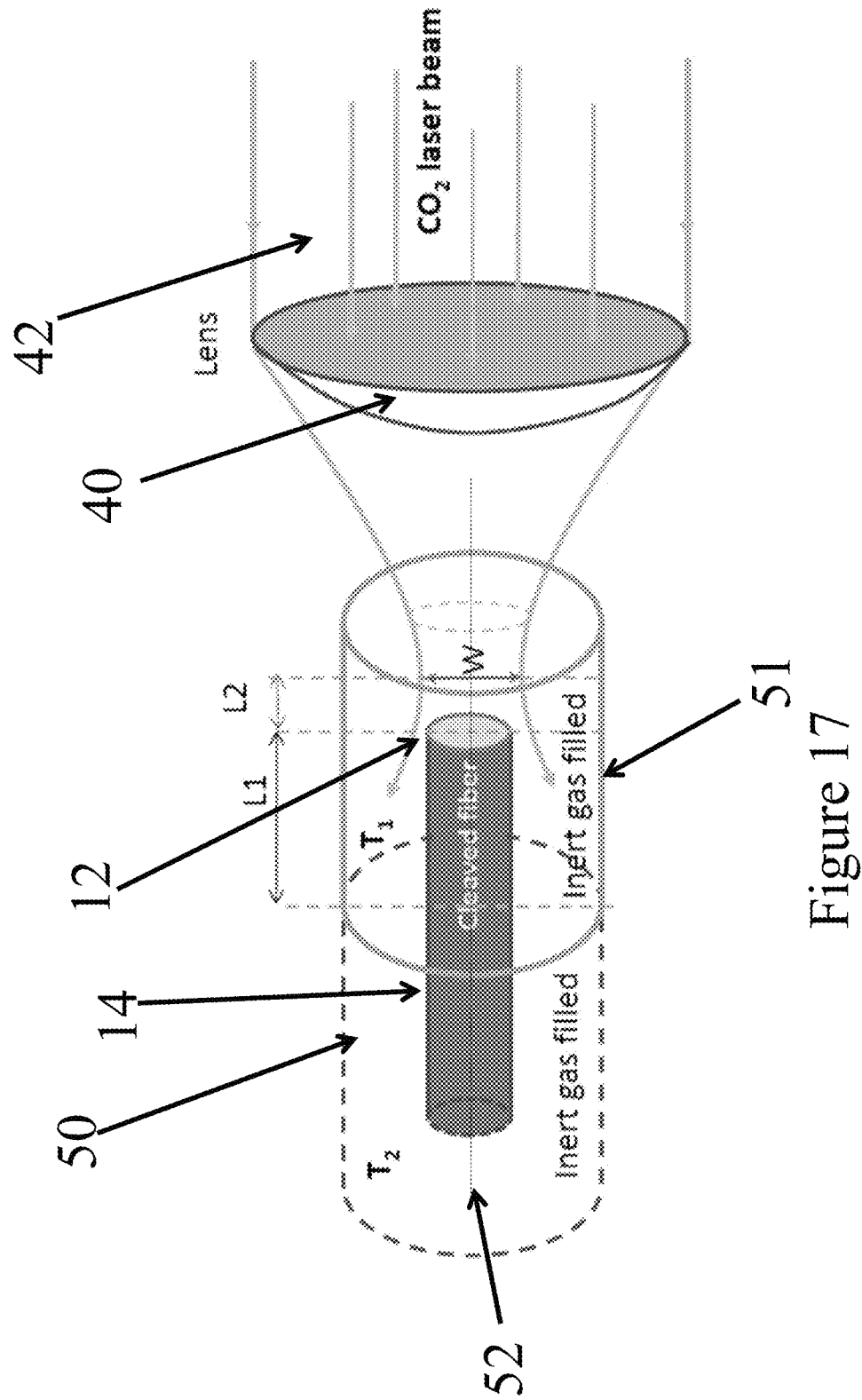
FIG. 17 illustrates an arrangement of another embodiment of the present invention based on a generally cylindrically-symmetric laser source (such as a $CO_2$ laser beam).

FIG. 17 illustrates an alternate embodiment of the invention that uses a collimated laser beam as the heating element. In a preferred embodiment, a collimated $CO_2$ laser beam 42 having a wavelength of approximately 10.6 microns is used as a heating source (to melt the fiber tip in a nearly cylindrically symmetric manner) in this illustrative example; this beam is focused on tip 12 of fiber 14, which may be composed of any of the glasses described above, including silica glasses, using a lens 40. Laser beams other than $CO_2$ laser beams may also be used as long as they are sufficiently strongly absorbed by the glass to enable the onset of glass heating. As another illustrative example, an approximately 1.5 micron wavelength nearly-cylindrically symmetric laser beam may be used for glass fibers that are heavily doped with erbium. The fiber is preferably—but not necessarily—placed in a two-section chamber, where each section could be set at significantly different temperatures (T1 and T2) if needed. Both sections are filled with an inert gas (such as nitrogen or argon). The first section 51 (where the fiber tip 12 is located) is at temperature T1 while the second one 50 is at temperature T2, which is preferably—but not necessarily—lower than T1. The coupling of the $CO_2$ laser radiation may be enabled by using an optical window (in a closed chamber) that is transparent to the 10.6 micron laser wavelength at the laser input port (at the entrance of the first section 51). Since fiber 14 absorbs the laser energy at far-IR, the temperature at the tip 12 will rise quickly above the melting point creating the desired microsphere. As the fiber tip melts, the surface tension pushes the melted material back into the cooler chamber section 50 along centerline 52. Cooling may also be provided by a thermoelectric or liquid flow cooler around the chamber and in other ways known to those of skill in the art.

The cooled chamber along centerline 52 allows the melted fiber, which has a formed microsphere, to achieve a rate of nearly uniform or symmetrical cooling that avoids crystallization. The optimal heating and cooling rates can be achieved by controlling the beam waist size (w), laser power, L1, L2 and the chamber temperature. L1 and L2 could have positive or negative values independent of each other. A positive value of L1 implies that the fiber tip 12 is protruding from the end of the cooling chamber for initial heating, while a negative value of L1 implies that the tip 12 lies within the cooling chamber. It may be preferable to have the inert gas filled cooled chamber completely surround fiber 14 (using negative values of L1); A negative value of L2 would imply that the focal spot (beam waist) of the $CO_2$ laser beam extends into the tip of the fiber (the schematic in FIG. 17 corresponds to positive values of L1 and L2). In addition, a single chamber may be provided that may contain an inert gas or a cooled inert gas. In addition, a plurality of partitions may be used with the same or different gases thererin at varying temperatures. A cooled inert gas is generally a gas that is lower than room temperature. Note that it is generally preferable, but not necessary, that the temperature T2 be lower than T1.

In summary, the present inventions will enable production of spherical, near-spherical and in general cylindrically symmetric WGM optical microresonators having demonstrated Q's of $10^7$ in MIR relevant glass, via a reliable fabrication method that is highly reproducible. The resulting high-Q optical microresonators should find use in a broad range of applications, including MIR spectroscopic and thermo-optical sensing of gas molecules, and the realization of extremely narrow-linewidth tunable MIR lasers, spectrally-structured fluorescent MIR sources and MIR comb sources. In addition, as previously demonstrated, the optical resonators of the inventions are expected to yield highly efficient MIR laser action in the 3 micron spectral region with the use of heavily doped Er: ZBLAN glass fibers. Microspheres made of heavily doped Er:ZBLAN should be thus suitable as low-threshold, narrow-linewidth and compact MIR microsphere lasers. Last, but not the least, the proposed microsphere fabrication techniques should facilitate more reliable and reproducible formation of high-Q microspheres with virtually any glass that is fiberizable, and for microspheres of a broad range of sizes—and glass types—covering much broader spectral ranges (including much shorter and longer wavelengths) than the MIR microspheres that have been the primary topic of discussion in this invention.

What is claimed is:

1. A method of fabricating an optical resonator from a glass fiber having a distal end and a proximal end comprising:
    creating a nearly symmetrical heating zone;
    locating the proximal end of the glass fiber in said heating zone along a centerline of the heating zone; and
    heating said proximal end by nearly symmetrical heating into a molten state to form a spherical end and cooling said spherical end by nearly symmetrical cooling by securing said distal end of said glass fiber a spaced distance from said heating zone on said centerline so that said spherical end is withdrawn along said centerline when said glass fiber shortens as a result of the cooling of said fiber.

2. The method of claim 1 wherein said optical resonator has an intrinsic quality factor greater than $10^6$.

3. The method of claim 1 wherein a plurality of individual glass fibers having spherical ends are produced with each spherical end having a nearly uniform size.

4. The method of claim 3 wherein the optical resonators have an intrinsic quality factor greater than $10^6$ over the 2.0 to 3.2 micron MIR wavelength range.

5. The method of claim 3 wherein the optical resonators have an intrinsic quality factor greater than $10^7$ over the 2.0 to 3.2 micron MIR wavelength range.

6. The method of claim 3 wherein the optical resonators have an intrinsic quality factor greater than $10^8$ over the 2.0 to 3.2 micron MIR wavelength range.

7. A method of fabricating an optical resonator from a glass fiber having a distal end and a proximal end comprising:
    creating a nearly symmetrical heating zone;
    locating the proximal end of the glass fiber in said heating zone along a centerline of the heating zone;
    inserting said spherical end 10 to 300 microns into said heating zone;

heating said proximal end by nearly symmetrical heating into a molten state to form a spherical end; and cooling said spherical end by nearly symmetrical cooling by drawing said spherical end away from said heating zone along said centerline.

8. The method of claim 7 wherein said optical resonator has an intrinsic quality factor greater than $10^6$.

9. The method of claim 7 wherein a plurality of individual glass fibers having spherical ends are produced with each spherical end having a nearly uniform size.

10. The method of claim 9 wherein the optical resonators have an intrinsic quality factor greater than $10^6$ over the 2.0 to 3.2 micron MIR wavelength range.

11. The method of claim 9 wherein the optical resonators have an intrinsic quality factor greater than $10^7$ over the 2.0 to 3.2 micron MIR wavelength range.

12. The method of claim 9 wherein the optical resonators have an intrinsic quality factor greater than $10^8$ over the 2.0 to 3.2 micron MIR wavelength range.

13. A method of fabricating an optical resonator from a glass fiber having a distal end and a proximal end comprising:

creating a nearly symmetrical heating zone;

locating the proximal end of the glass fiber in said heating zone along a centerline of the heating zone;

inserting said spherical end 130 to 230 microns into said heating zone;

heating said proximal end by nearly symmetrical heating into a molten state to form a spherical end; and cooling said spherical end by nearly symmetrical cooling by drawing said spherical end away from said heating zone along said centerline.

14. The method of claim 13 wherein said optical resonator has an intrinsic quality factor greater than $10^6$.

15. The method of claim 13 wherein a plurality of individual glass fibers having spherical ends are produced with each spherical end having a nearly uniform size.

16. The method of claim 15 wherein the optical resonators have an intrinsic quality factor greater than $10^6$ over the 2.0 to 3.2 micron MIR wavelength range.

17. The method of claim 15 wherein the optical resonators have an intrinsic quality factor greater than $10^7$ over the 2.0 to 3.2 micron MIR wavelength range.

18. The method of claim 15 wherein the optical resonators have an intrinsic quality factor greater than $10^8$ over the 2.0 to 3.2 micron MIR wavelength range.

19. A method of fabricating an optical resonator from a glass fiber having a distal end and a proximal end comprising:

creating a nearly symmetrical heating and cooling zone;

said heating zone contains an inert gas and said cooling zone contains a cooled inert gas:

locating the proximal end of the glass fiber in said heating zone along a centerline of said heating zone;

locating the distal end of the glass fiber in said cooling zone along a centerline, said cooling zone having an inert gas therein;

heating said proximal end by nearly symmetrical heating in said heating zone into a molten state to form a spherical end; and cooling said spherical end in said cooling zone by nearly symmetrical cooling by drawing said spherical end away from said heating zone along said centerline.

20. The method of claim 19 wherein said optical resonator has an intrinsic quality factor greater than $10^6$.

\* \* \* \* \*